US008386759B1

(12) United States Patent
Duwel

(10) Patent No.: US 8,386,759 B1
(45) Date of Patent: Feb. 26, 2013

(54) INTEGRATED CIRCUIT BOOT METHOD AND APPARATUS FOR CONFIGURING MEMORY DEVICE READ MODE USING PROGRAMMABLE CIRCUITRY BOOT CODE READ FROM THE MEMORY DEVICE

(75) Inventor: Keith Duwel, Danville, CA (US)

(73) Assignee: Altera Corporation, San Jose, CA (US)

( * ) Notice: Subject to any disclaimer, the term of this patent is extended or adjusted under 35 U.S.C. 154(b) by 977 days.

(21) Appl. No.: 12/290,855

(22) Filed: Nov. 4, 2008

Related U.S. Application Data

(60) Provisional application No. 61/009,448, filed on Dec. 28, 2007.

(51) Int. Cl.
*G06F 15/177* (2006.01)
(52) U.S. Cl. .................... 713/2; 326/39; 711/103
(58) Field of Classification Search .............. 711/103; 326/39; 713/2
See application file for complete search history.

(56) References Cited

U.S. PATENT DOCUMENTS

| | | | |
|---|---|---|---|
| 6,172,936 B1 * | 1/2001 | Kitazaki | 365/233.17 |
| 6,711,059 B2 * | 3/2004 | Sinclair et al. | 365/185.11 |
| 7,000,161 B1 | 2/2006 | Allen et al. | |
| 7,215,578 B2 * | 5/2007 | Chiang et al. | 365/185.33 |
| 2005/0160218 A1 * | 7/2005 | See et al. | 711/103 |
| 2008/0028165 A1 * | 1/2008 | Sukegawa | 711/154 |

OTHER PUBLICATIONS

Open NAND Flash Interface Specification, Revision 1.0, Dec. 28, 2006.*

* cited by examiner

*Primary Examiner* — Albert Wang
(74) *Attorney, Agent, or Firm* — Mauriel Kapouytian & Treffert LLP; Michael Mauriel; Nirav Amin

(57) ABSTRACT

An integrated circuit ("IC") including a configurable configuration controller and associated IC boot program product is disclosed. One embodiment of the present invention provides an IC boot program product including IC boot code for configuring a configuration controller of an IC such that an updated programming file can be read out of the configuration memory prior to loading an initial default programming file from the configuration memory into configuration elements of the IC. Another embodiment of the present invention provides an IC boot program product including IC boot code for configuring a configuration controller of an IC in accordance with a particular configuration memory interface selected from a plurality of such interfaces. Another embodiment of the present invention provides a method for reading configuration memory device information in a first read mode and then reading a programming file from the configuration memory device in a second read mode. Another embodiment of the invention provides an IC including a configurable configuration controller adapted to be configured by IC boot code read from a configuration memory device.

22 Claims, 4 Drawing Sheets

INTEGRATED CIRCUIT BOOT METHOD AND APPARATUS FOR CONFIGURING MEMORY DEVICE READ MODE USING PROGRAMMABLE CIRCUITRY BOOT CODE READ FROM THE MEMORY DEVICE

CROSS REFERENCE TO RELATED APPLICATION

This application claims the benefit of U.S. Provisional Application No. 61/009,448, filed Dec. 28, 2007.

BACKGROUND OF THE INVENTION

The present invention relates to a configurable configuration controller of an integrated circuit ("IC"), a boot program product for configuration of the configuration controller, and associated methods.

Some ICs have configuration elements that may be programmed or reprogrammed. Such ICs include field programmable gate arrays ("FPGAs") (also sometimes referred to as programmable logic devices ("PLDs"), complex PLDs ("CPLDs"), programmable array logic ("PALs"), programmable logic arrays ("PLAs"), field PLAs ("FPLAs"), erasable PLDs ("EPLDs"), electrically erasable PLDs ("EEPLDs") and logic cell arrays ("LCAs")) and ICs, such as application specific integrated circuits ("ASICs"), that have traditionally been fixed. It is possible for the latter to have a portion or portions that are programmable.

With respect to FPGAs, a user who is designing a system typically uses the FPGA to implement a particular device design maximized for a particular system application. The design is implemented in the FPGA by what is commonly known as a programming output file ("POF") which contains configuration data to configure the FPGA in accordance with the user's design. The FPGA is configured by loading the POF into configuration elements of the FPGA. This process is carried out after the POF has been loaded into a configuration memory device connected to the FPGA. Subsequently, upon startup of the FPGA, a configuration controller of the FPGA reads the POF from the configuration memory and loads it into the FPGA's configuration elements which are generally dispersed across the device.

At present, the configuration memory is typically housed in a separate memory chip such as a flash memory chip that is connected to the FPGA. Existing configuration controllers are typically implemented as a block of hardwired logic on the FPGA itself. This implementation means that the configuration steps that the configuration controller will perform must be known at the time the FPGA is fabricated.

SUMMARY OF THE INVENTION

Relying exclusively on hardwired logic for implementing the startup tasks of the configuration controller poses at least two problems. The first problem relates to updating the programming file. When an end user implements a system, an initial programming file is typically created and loaded into a specified portion of the configuration memory device. In typical past implementation, the IC controller is hardwired to automatically read out that portion of the configuration memory upon power-up. The problem arises when an updated programming file is loaded into the configuration memory. That updated programming file will be loaded into a different portion of the configuration memory. On startup, the configuration controller will still load the initial programming file rather than the updated programming file. The updated programming file can then be loaded, but only after the initial programming file has been loaded to bring the IC to user mode.

The second problem relates to interfacing with a variety of flash memory or other memory devices that might be used to implement a configuration memory. The variety of flash memory devices available is increasing and many flash memory devices now offer specialized modes that support higher performance read operations. However, the interface parameters for various devices are not necessarily all common, particularly with respect to higher performance modes such as, for example, synchronous burst read modes. Moreover, given the pace with which flash memory devices are developing, it is increasingly difficult and impractical to hardwire all the potentially relevant flash memory device interface parameters into an IC configuration controller at the time of the IC's fabrication.

Solving both the programming file update problem and the flash interface problem can be accomplished by a software implementation of certain IC start up tasks and by providing an IC controller adapted to be configured by IC boot code. One embodiment of the present invention provides an IC boot program product including IC boot code for configuring a configuration controller of an IC such that an updated programming file can be read out of the configuration memory prior to loading an initial default programming file from the configuration memory into configuration elements of the IC. Another embodiment of the present invention provides an IC boot program product including IC boot code for configuring a configuration controller of an IC in accordance with a particular configuration memory device interface selected from a plurality of such interfaces. Another embodiment of the present invention provides a method for reading configuration memory device information in a first read mode and then reading a programming file from the configuration memory device in a second read mode. Another embodiment of the invention provides a configurable configuration controller adapted to be configured by IC boot code read from a configuration memory device.

BRIEF DESCRIPTION OF THE DRAWINGS

The novel features of the invention are set forth in the appended claims. However, for purpose of explanation, several aspects of a particular embodiment of the invention are described by reference to the following figures.

FIG. 3 also illustrates a process in accordance with an embodiment of the present invention in which configuration memory device information is read in a first read mode and, once the configuration controller is configured to interact with the configuration memory device in one or more high performance modes, a selected POF is read from the configuration memory device in a second read mode.

DETAILED DESCRIPTION OF THE INVENTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
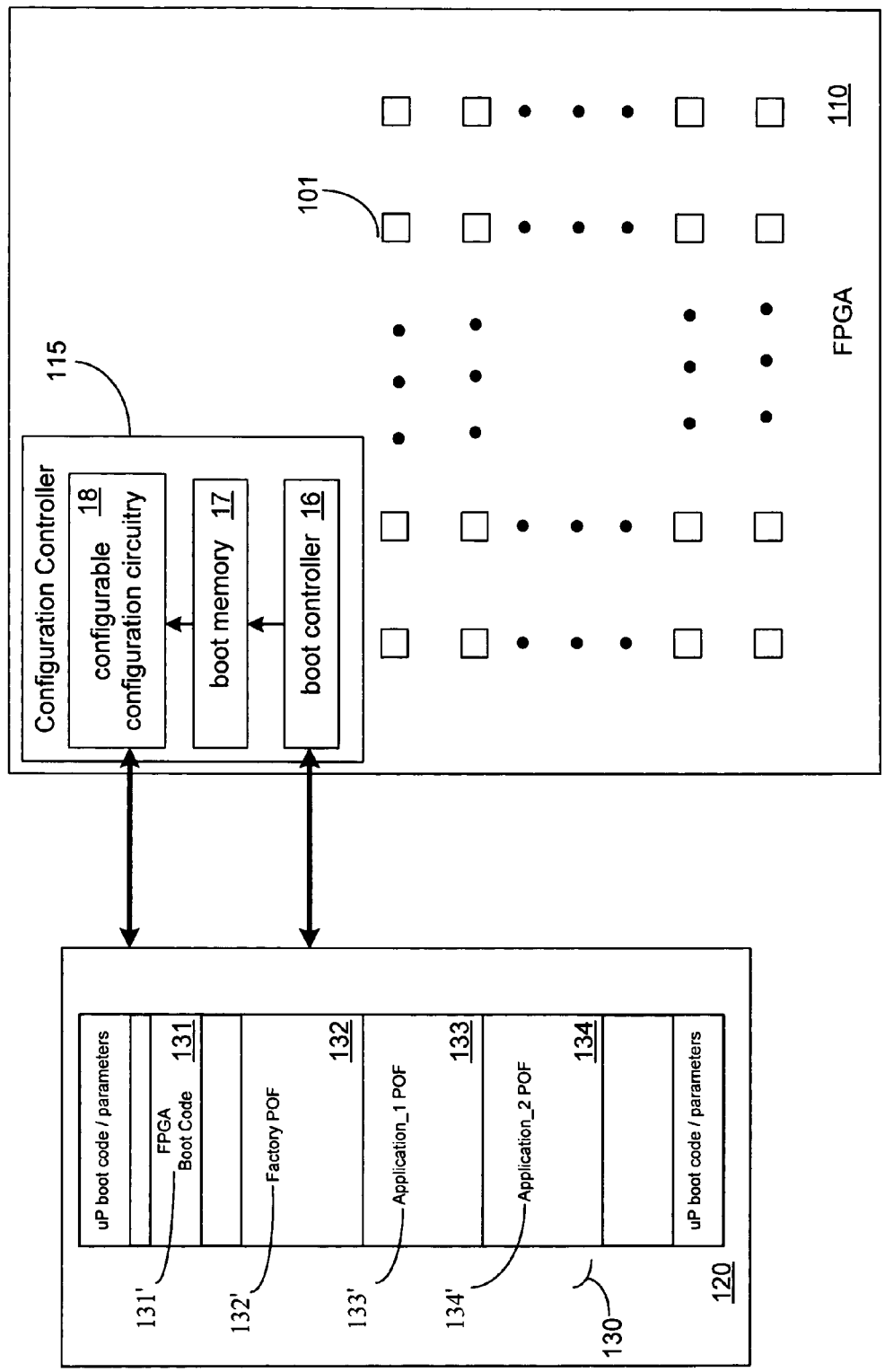
FIG. 1 illustrates an FPGA and associated FPGA boot code held in a configuration memory device. The FPGA contains a configuration controller adapted to be configured by the FPGA boot code in accordance with an embodiment of the present invention.

FIG. 1 illustrates an FPGA system 100 including FPGA 110 and configuration memory device 120. FPGA 110 includes configuration controller 115 and an array of FPGA configuration elements 101. Configuration controller 115 includes boot controller 16, boot memory 17, and configurable configuration circuitry 18. Configuration memory device 120 includes memory sectors holding associated data content as illustrated by memory map 130. Memory map 130 illustrates memory sectors 131, 132, 133, and 134 which contain, respectively, FPGA Boot Code 131', Factory POF 132', Application_1 POF 133', and Application_2 POF 134'.

Configuration boot controller 16 is hardwired to, upon startup, attempt connection with configuration memory device 120 and read the contents of sector 131, which contains FPGA boot code 131'. Using boot controller 16, configuration controller 115 reads FPGA boot code 131' into boot memory 17. Boot memory 17 serves to configure configurable configuration circuitry 18 with the data in FPGA boot code 131'. FPGA boot code 131' contains data to configure configuration controller 115 to interact with configuration memory device 120 in accordance with potentially device-specific interface parameters corresponding to configuration memory device 120. By way of example, such device-specific interface parameters may include parameters relating to a synchronous burst read mode of configuration memory device 120. This is explained further in the context of FIG. 3.

Continuing with the description of FIG. 1, FPGA boot code 131' also includes data to configure configuration controller to next read a particular sector of a plurality of possible sectors of the memory of configuration memory device 120. The particular sector holds a particular POF distinct from other POFs held in other sectors of the memory of configuration memory device 120.

By way of example and further explanation, at the time a user first implements FPGA system 100 in a particular product, the user may have designed the system by developing and then using a particular initial POF. Configuration controller 115 uses the POF to configure FPGA 110 by loading configuration data included in the POF into configuration elements 101, which, in a particular example, are generally arranged in an array of rows and columns and dispersed across much or most of the core of the FPGA. That initial POF is referred to in this example as Factory POF 132'. The word "factory" in this context simply references that the POF is an initial POF used to configure FPGA 110 in the first implementation of the end-product system of which FPGA system 100 is a part.

However, the FPGA user (who generally is using the FPGA to design an end-product system) may subsequently desire to update the configuration of the FPGA and thus prepare and load (remotely or locally) an updated POF, for example, Application_1 POF 133'. When such an update occurs, particularly if done remotely, it is generally preferable to make the prior POF still available in case the FPGA does not operate properly with the configuration implemented by the new POF. Thus, the new POF is written into a different memory sector and the prior POF remains in the same location it was in initially. In this example, Application_1 POF 133' is in memory sector 133. In this example, an end user would select options in a program generating an update to FPGA boot code 131' such that FPGA boot code 131' configures configuration controller 115 to first read Application_1 POF 133' from sector 133 and attempt to configure FPGA 110 with that POF before reading and trying to configure FPGA 110 with Factory POF 132'. If configuration controller does not successfully configure FPGA 110 with Application_1 POF 133', then FPGA boot code 131' may provide for configuring FPGA 110 with Factory POF 131' as a default. Such an option is particularly useful if update of the Application POF is being attempted via a remote connection.

Similarly, another update process might be used subsequently to provide another updated POF such as, in this example, Application_2 POF 134' loaded into memory sector 134. FPGA boot code 131' may also be updated to configure configuration controller 115 to first read and attempt FPGA configuration using Application_2 POF 134' and, if not successful, read and try configuration using the other POFs in a specified order such as, for example, Application_1 POF 133' and, finally, Factory POF 132'.

In the illustrated example, FPGA boot code 131' is provided as a separate file to be loaded into a single sector of the memory of configuration memory device 120. However, in alternative embodiments, FPGA boot code may be provided as a header to one or more POF files stored on the configuration memory device. In such an implementation, a configuration controller would still receive the FPGA boot code prior to loading any particular POF and could be, configured by the FPGA boot code to read a different POF than the POF to which the FPGA boot code was attached as a header. Specifically, in such a scenario, after loading the FPGA boot code attached to the initial POF, the remainder of the initial POF would not be read, and instead the reading of a subsequent POF would begin. Such an implementation may offer the possibility of providing greater transparency to the FPGA user.

Figure 2:
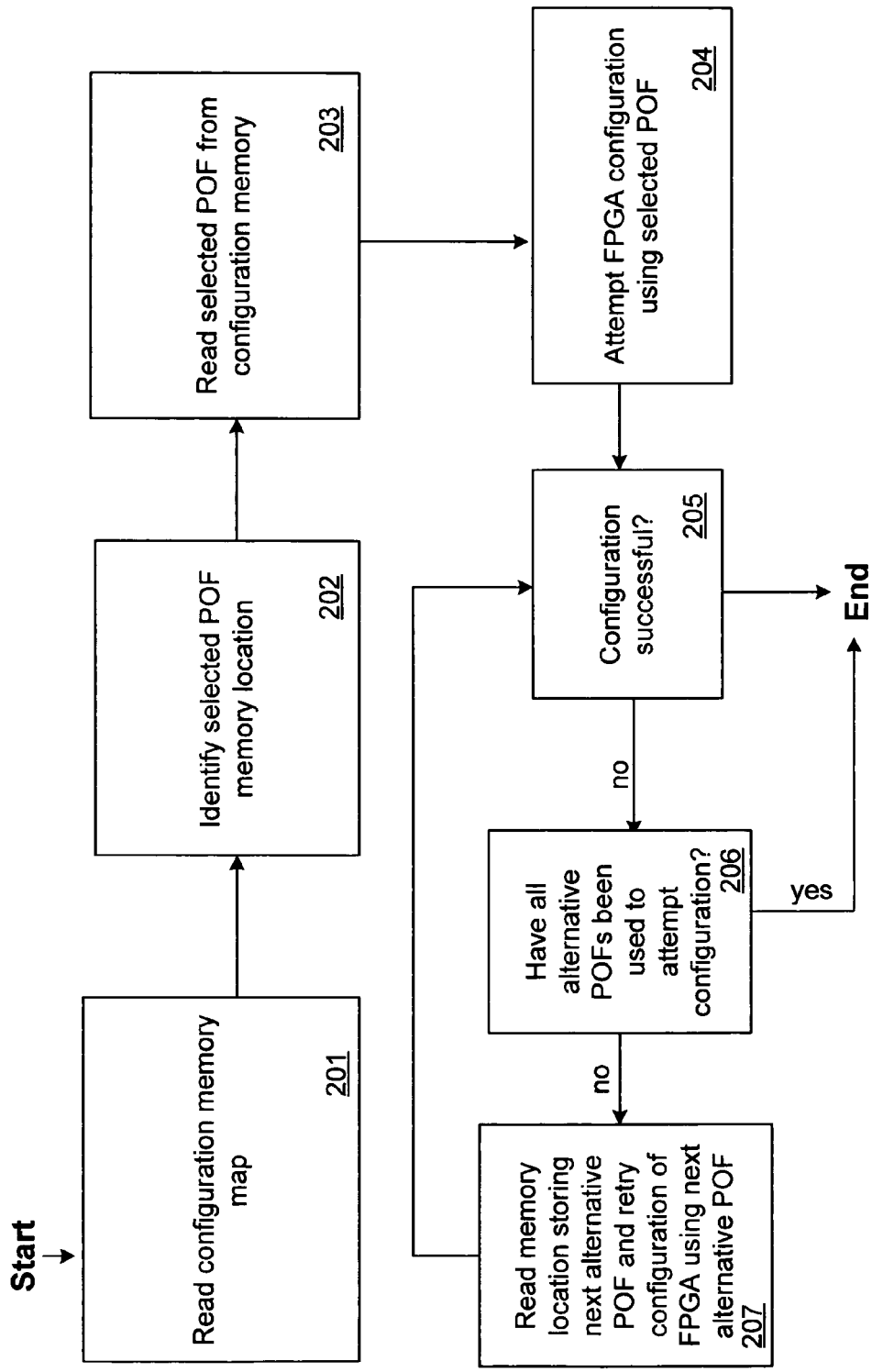
FIG. 2 is a flow diagram illustrating POF selection logic implemented by the configuration controller of FIG. 1 when running FPGA boot code in accordance with an embodiment of the present invention.

FIG. 2 is a flow diagram illustrating a POF selection process 200 implemented by the configuration controller 115 of FIG. 1 as configured by FPGA boot code 131' in accordance with an embodiment of the present invention.

At step 201, a map of the configuration memory device's memory is read by the configuration controller. At step 202, a memory location of a selected POF is identified. At step 203, the selected POF is read from the configuration memory device by the configuration controller. At step 204, the configuration controller attempts to configure the FPGA using the selected POF. At step 205, the configuration controller determines whether FPGA configuration using the first selected POF was successful. If yes, then the process ends. If no, then, at step 206, the configuration controller determines whether all alternative POFs have been used to attempt configuration (e.g., has each application POF been tried and has the factory POF also been tried?). If yes, then the process ends (without successful configuration). However, if the result of step 206 is no, then the process proceeds to step 207 and the configuration controller reads the next alternative POF and tries configuration again using that next POF. The process then proceeds back to step 205 to determine whether configuration was successful.

Figure 3:
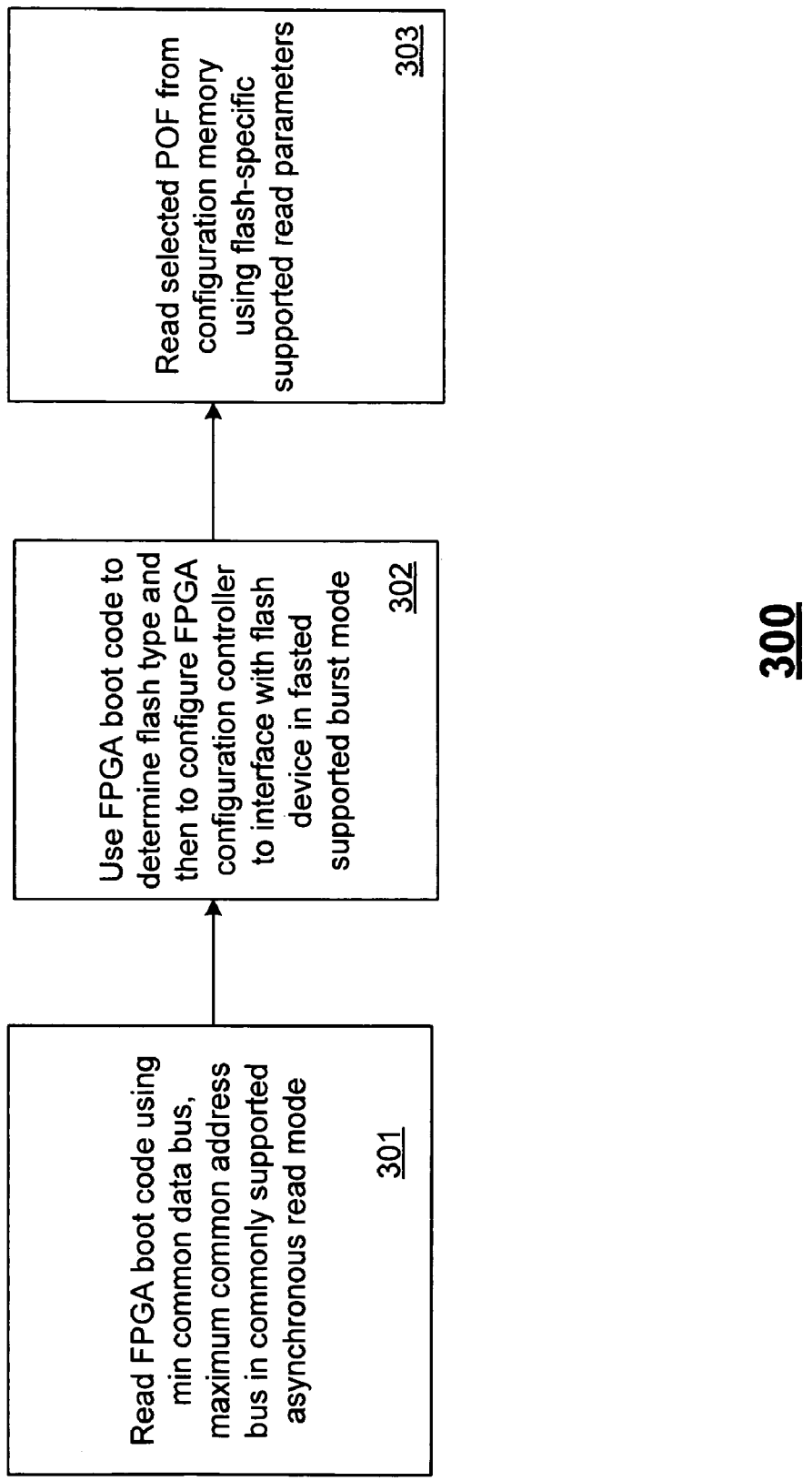
FIG. 3 is a flow diagram illustrating memory device-specific interface configuration implemented by FPGA boot code in accordance with an embodiment of the present invention.

FIG. 3 is a flow diagram illustrating a method 300 in accordance with an embodiment of the present invention. In the present example, method 300 implements configuration of a configuration controller (such as configuration controller 115 of the embodiment of FIG. 1) by FPGA boot code (such as FPGA boot code 131' of FIG. 1) in accordance with configuration memory device interface parameters that are specific for a particular configuration memory device (such as configuration memory device 120 of FIG. 1). FIG. 3 also illustrates a process in accordance with an embodiment of the present invention in which configuration memory device information is read in a first read mode and, once the configuration controller is configured to interact with the configuration memory device in one or more high performance modes, a selected POF is read from the configuration memory device in a second read mode.

One challenge in implementing a method such as method 300 is that the flash-specific parameters must be read from the flash device (or other configuration memory device) before the configuration controller has been configured in accordance with those parameters. This may appear to be a catch-22 as those parameters are for the very purpose of interfacing efficiently with that particular device. However, a particular population of flash memory devices generally has at least one common read mode, typically an asynchronous slow read. The capability for interfacing in such a mode can be hard-wired into a configuration controller such as controller 115 so that it can be initiated prior to receipt of data for configuring the controller in accordance with parameters associated with a flash-specific mode.

"Device-specific" or "flash-specific" as used herein does not imply that the mode and/or associated parameters are entirely unique to a particular flash device. Rather, it means that of the population of flash devices for which the configuration controller can be configured to interface with by FPGA boot code in accordance with an embodiment of the present invention, there are one or more interface modes/parameter sets that are not identical across the entire population of such flash devices.

Turning now to FIG. 3 in further detail, at step 301, the configuration controller reads the FPGA boot code using a minim common data bus, a maximum common address bus, and a commonly supported asynchronous read mode. In other words, among the population of flashes that can be fully supported by an application controller in accordance with an embodiment of the present invention, the read mode and corresponding parameters that can be supported by all the relevant flash devices are used to read the FPGA boot code.

In the case of the data bus, most present flashes generally support a data bus that is 8-bits wide and some support data widths of 16 bits. In an asynchronous read mode, the bus is only used for an output. Using an 8-bit data bus allows a common interface that can receive data from flashes that support both 8-bit and 16-bit data widths. Those skilled in the art will understand that the specific minimum data-width size referenced herein (8 bits) is simply an example based on the context of devices that are presently generally available. At step 301, the minimum common data bus among the relevant flash devices is assumed.

With respect to the address bus, the size of the address bus depends upon the amount of addressable memory space for a particular flash device. By assuming the largest amount of addressable memory among the devices to be supported, a common address bus that can receive the address bits for all the supported flashes can be obtained. If the particular flash used in a given application has a smaller address bus, then some of the pins reserved for receiving address bits will not be used during the read of the FPGA boot code. However, the number of excess pins reserved in such cases will generally be small enough to be acceptable for most applications. Thus, at step 301, the largest common address bus among the relevant flash devices is assumed.

Step 301 reads the data in an asynchronous read mode, which is generally supported across all flash devices. In such a mode, the read of the data is not clocked and it can be interrupted. In the context of an exemplary configuration controller such as configuration controller 115 shown in FIG. 1, such a read would be performed by boot controller 16.

At step 302, the configuration controller, using the FPGA boot code, first confirms the flash device type. Next, the configuration controller is configured—using configuration data in the FPGA boot code—to support the fastest burst read mode of the particular flash device.

At step 303, the selected POF (see FIG. 2) is read from the flash device using the fastest mode supported by the flash. Generally this will be a synchronous burst read mode. In the context of an exemplary configuration controller such as configuration controller 115 shown in FIG. 1, such a read would be performed by configurable configuration circuitry 18.

Table A illustrates with further detail the states of the control, address, and data buses interacting with the flash device as the configuration controller proceeds from a "power-up" state to a "read POF" state.

TABLE A

| Active Controller State | flash bus | | | configuration system* | flash information |
|---|---|---|---|---|---|
| | control | address | data | | |
| power-up | tri-state | tri-state | tri-state | unknown | unknown |
| ascertain active mode & control of flash bus | tri-state | tri-state | tri-state | unknown | unknown |
| read FPGA boot code | asynchronous read | largest supported | 8 bit | unknown | unknown |
| confirm flash type | flash specific | flash specific | flash specific | known | known |
| setup fastest burst read | flash specific | flash specific | flash specific | known | known |
| read POF | flash specific | flash specific | flash specific | known | known |

*configuration system = known is either "normal", "remote update" or "local update"

As part of setting up the fastest burst read mode specific to the particular flash, the configuration controller will be configured in accordance with various aspects of that mode. These aspects may include the relevant instruction set, timing parameters (e.g. setup time $t_{su}$, hold time $t_h$, clock to output time $t_{co}$, minimum clock period and/or other parameters), address and data bus size of the particular flash mode as well as other aspects. Furthermore, the FPGA boot code may effectively include information relevant to other modes in addition to the fastest burst read mode of the relevant flash.

Figure 4:
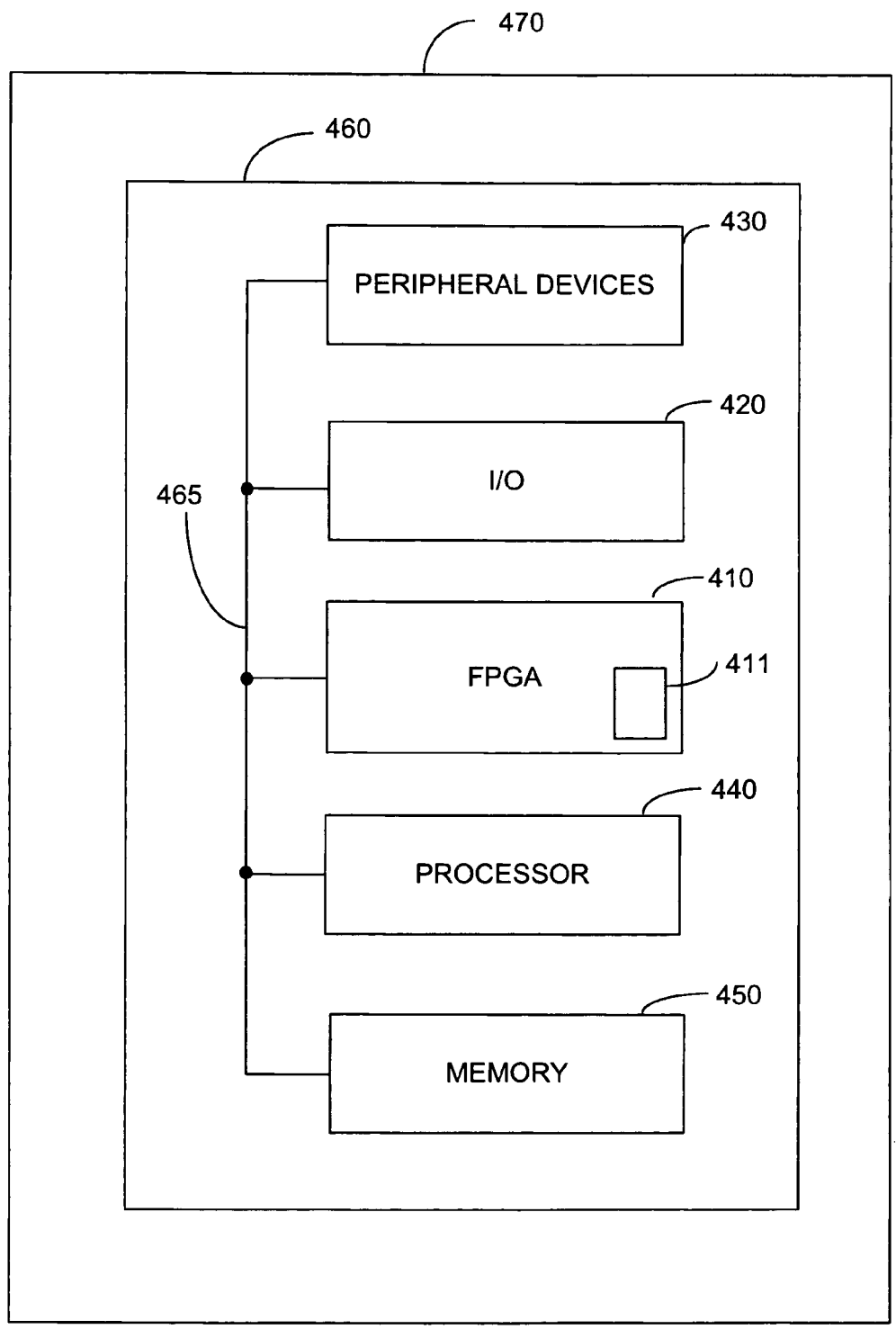
FIG. 4 illustrates a data processing system in which an embodiment of the present invention might be implemented.

FIG. 4 illustrates an FPGA 410 including a configurable configuration controller 411 in accordance with an embodiment of the present invention. Configuration controller 411 may be implemented as a configuration controller such as configuration controller 115 of FIG. 1. FIG. 4 further illustrates FPGA 410 implemented in a data processing system 400. Data processing system 400 may include one or more of the following components: a processor 440; memory 450; I/O circuitry 420; and peripheral devices 430. These components are coupled together by a system bus 465 and are populated on a circuit board 460 which is contained in an end-user system 470. A data processing system such as system 400 may include a single end-user system such as end-user system 470 or may include a plurality of systems working together as a data processing system.

System 400 can be used in a wide variety of applications, such as computer networking, data networking, instrumentation, video processing, digital signal processing, or any other application where the advantage of using programmable or reprogrammable logic in system design is desirable. FPGA 410 can be used to perform a variety of different logic functions. For example, FPGA 410 can be configured as a processor or controller that works in cooperation with processor 440 (or, in alternative embodiments, an FPGA might itself act as the sole system processor). FPGA 410 may also be used as an arbiter for arbitrating access to shared resources in system 400. In yet another example, FPGA 410 can be configured as an interface between processor 440 and one of the other components in system 400. It should be noted that system 400 is only exemplary.

In one embodiment, system 400 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. An integrated circuit ("IC") boot program product including IC boot code in a non-transitory machine readable medium, the boot code being for at least:
    being received from one of a plurality of possible configuration memory devices by a configuration controller of an IC in a default read mode, the default read mode being common to the plurality of possible configuration memory devices; and
    configuring the configuration controller by configuring programmable circuitry in the configuration controller in accordance with parameters of a fastest supported read mode of the one of the plurality of possible configuration memory devices to allow the configuration controller to communicate with the one of the plurality of possible configuration memory devices in the fastest supported read mode.

2. The IC boot program product of claim 1 wherein the parameters include parameters for a synchronous burst mode read of the configuration memory device.

3. The IC boot program product of claim 1 wherein the parameters include an instruction set supported by the select one of the plurality of possible configuration memory devices.

4. The IC boot program product of claim 1 wherein the parameters include timing parameters supported by the select one of the plurality of possible configuration memory devices.

5. The IC boot program product of claim 4 wherein the timing parameters include one or more of: setup time ("tsu"), hold time ("th"), clock to output time ("tco"), and minimum clock period.

6. A method of configuring a configuration controller of an integrated circuit ("IC") to interact with a particular configuration memory device of a plurality of configuration memory devices, the method comprising:
    triggering the configuration controller to read boot code from the particular configuration memory device in a default read mode, the default read mode being common to the plurality of configuration memory devices; and
    using the boot code to configure programmable circuitry in the configuration controller to interact with the particular configuration memory device in accordance with parameters of a fastest supported read mode of the particular configuration memory device.

7. The method of claim 6 wherein the default read mode utilizes a number of data input pins corresponding to a minimum data bus size of the plurality of flash memory devices.

8. The method of claim 6 wherein the default read mode utilizes up to a maximum number of address input pins corresponding to a maximum address bus size of the plurality of configuration memory devices.

9. The method of claim 6 wherein the fastest supported read mode comprises a burst mode.

10. The method of claim 6 wherein the parameters include an instruction set supported by the configuration memory device.

11. The method of claim 6 wherein the parameters include timing parameters supported by the configuration memory device.

12. The method of claim 11 wherein the timing parameters include one or more of: setup time ("tsu"), hold time ("th"), clock to output time ("tco"), and minimum clock period.

13. An integrated circuit ("IC") comprising:
    a configuration controller comprising programmable circuitry, the programmable circuitry adapted to be configurable by IC boot code to interface with a particular configuration memory device in accordance with interface parameters of a second read mode of the particular configuration memory device, the particular configuration memory device selected from a plurality of possible configuration memory devices;
    the configuration controller adapted to read the IC boot code from the particular configuration memory device in a first read mode, the first read mode being common to the plurality of possible configuration memory devices.

14. The IC of claim 13 wherein:
    the configuration controller is adapted to read, subsequently to being configured by the IC boot code, a programming file from the particular configuration memory device in the second read mode supported by the particular configuration memory device, the programming file including configuration data for loading into configuration elements in a core of the IC, the second read mode being a faster read mode than the first read mode.

15. The IC of claim 14 wherein the first read mode is an asynchronous read mode and the second read mode is a synchronous burst read mode.

16. The IC of claim 14 wherein the configuration controller is adapted to support, in the first read mode, a minimum data bus width supported by any configuration memory device of the plurality of possible configuration memory devices.

17. The IC of claim 14 wherein the configuration controller is adapted to support, in the first read mode, a maximum address bus width supported by any configuration memory device of the plurality of possible configuration memory devices.

18. A data processing system comprising the IC of claim 13.

19. The IC of claim 13 wherein the configuration controller is adapted to be configurable by IC boot code to interface in accordance with an instruction set supported by the particular configuration memory device.

20. The IC of claim 13 wherein the configuration controller is adapted to be configurable by IC boot code to interface in accordance with timing parameters supported by the particular configuration memory device.

21. The IC of claim 20 wherein the timing parameters include one or more of: setup time ("tsu"), hold time ("th"), clock to output time ("tco"), and minimum clock period.

22. A configuration controller for controlling configuration of an integrated circuit ("IC") using IC configuration data, the configuration controller comprising:
- boot means for controlling the configuration controller to read controller configuration data for configuring the configuration controller, wherein the controller configuration data is read from a particular configuration memory device of a plurality of configuration memory devices in a first read mode, the first read mode being common to the plurality of configuration memory devices; and
- configuration means for configuring programmable means in the configuration controller using the controller configuration data in accordance with interface parameters of a second read mode of the particular configuration memory device.

* * * * *